United States Patent [19]

Hasegawa

[11] Patent Number: 5,745,232
[45] Date of Patent: Apr. 28, 1998

[54] APPARATUS FOR INSPECTING DEFORMATION OF PIPE

[75] Inventor: Kiyoshi Hasegawa, Tokyo, Japan

[73] Assignee: Kansei Kogyo Co., Ltd., Tokyo, Japan

[21] Appl. No.: 682,765

[22] PCT Filed: Mar. 17, 1994

[86] PCT No.: PCT/JP94/00429
§ 371 Date: Jul. 3, 1996
§ 102(e) Date: Jul. 30, 1996

[87] PCT Pub. No.: WO95/21367
PCT Pub. Date: Aug. 10, 1995

[30] Foreign Application Priority Data

Feb. 3, 1994 [JP] Japan .................... 6-033095

[51] Int. Cl.$^6$ .................................. G01B 11/26
[52] U.S. Cl. .................................. 356/153
[58] Field of Search .................. 356/399, 400, 356/153

[56] References Cited

U.S. PATENT DOCUMENTS

| | | | |
|---|---|---|---|
| 3,591,926 | 7/1971 | Trice, Jr. | 356/153 |
| 3,599,336 | 8/1971 | Walsh | 356/153 |
| 3,631,601 | 1/1972 | McNulty | 356/153 |
| 3,907,435 | 9/1975 | Roodvoets | 356/153 |
| 4,043,679 | 8/1977 | George et al. | 356/153 |
| 4,053,238 | 10/1977 | George et al. | 356/249 |
| 4,191,207 | 3/1980 | Jacobi et al. | 356/400 |
| 5,347,136 | 9/1994 | Ammann | 356/400 |

*Primary Examiner*—Frank G. Font
*Assistant Examiner*—Zandra V. Smith
*Attorney, Agent, or Firm*—Pearne, Gordon, McCoy & Granger LLP

[57] ABSTRACT

An inspection apparatus is disclosed which is adapted to accurately detect an irradiated position on a target board which is irradiated with a beam, to thereby inspect deformation of a pipe such as a sewer or the like. A laser beam emitting unit (3) is arranged on one end side of a sewer (1). The laser beam emitting unit (3) is so adjusted that a laser beam (15) is impinged on a target board (11) of a target vehicle (9) traveling from the other end side of the pipe toward the laser beam emitting unit (3). The target board (11) is provided thereon with a plurality of phototransistors (13), whereby the irradiated position is detected depending on electric signals generated by the phototransistors.

2 Claims, 2 Drawing Sheets

APPARATUS FOR INSPECTING DEFORMATION OF PIPE

TECHNICAL FIELD

This invention relates to an inspection apparatus for inspecting deformation of a pipe such as a sewer or the like.

BACKGROUND ART

In general, a sewer is laid under the ground at a suitable gradient in view of topography, geology, a size or diameter of the sewer and a material for the sewer. Unfortunately, vibration applied from a vehicle traveling on the ground to the sewer, earthquake, a variation in ground or the like causes differential or uneven settlement of the sewer, leading to deformation or meandering of the sewer, vertical deviation of the sewer from a horizontal plane or the like. Such deformation of the sewer fails to permit sewage to smoothly flow toward a downstream side in the sewer or causes deposition of earth or sand in the deformed portion of the sewer. Thus, it is required to inspect deformation of the sewer at a suitable timing or time interval.

Inspection of deformation of a pipe is conventionally carried out in such a manner as shown in FIG. 4. More particularly, a laser beam emitting unit A which is provided thereon with a beam source F is fixedly arranged in the pipe so as to be positioned on one end side of the pipe and a target vehicle B is arranged so as to travel from the other end side of the pipe toward the laser beam emitting unit A in the pipe. The target vehicle B is provided thereon with a target board C and the laser beam emitting unit A is adjusted so as to permit a laser beam to be irradiated to or impinged on the target board C. When a height of a bottom F of a portion of the pipe at which the laser beam emitting unit A is positioned, a vertical distance between the pipe bottom E and the beam source E of the laser beam emitting unit A, a vertical distance between a bottom of a portion of the pipe at which the target board C is positioned and a center G of the target board C, a vertical distance between the center G of the target board C and an irradiated position I on the target board C to which the laser beam D is irradiated, and a vertical deviation between the irradiated position I and a virtual irradiated position on the target board C supposed when the laser beam D is horizontally emitted toward the target board C are indicated at H, H', R, R1 and J, respectively; a height L of a bottom K of a portion of the pipe at which the target vehicle B is positioned is represented by the following expression:

$$L = H + H' - (R + R1) + J$$

In FIG. 4, the distance R1 and deviation J each are a negative value and the deviation J is obtained by an angle of emission of the laser beam D and a distance between the beam source F and the target board C.

Continuous or intermittent recording of the height L of the pipe bottom K with movement of the target vehicle B permits vertical deformation of the pipe to be recognized.

Detection of the irradiated position I on the target board C which is irradiated with the laser beam D may be visually carried out through recording of an image of the target board C by a TV mounted on the target vehicle B after the inspection.

Deformation of the pipe in a lateral direction thereof may be recognized by continuously or intermittently recording a position of a lateral portion M of the pipe.

Actually, it is highly difficult or troublesome to accurately recognize the irradiated position I on the target board C which is irradiated with the laser beam D depending on recording of the image by the TV, so that detection of the irradiated position I with time is carried out with reduced or deteriorated accuracy. A deterioration in accuracy at which the irradiated position I is detected causes detection of deformation of the pipe to be necessarily carried out with accuracy deteriorated correspondingly.

In view of the foregoing, an object of the present invention is to provide an inspection apparatus which is capable of permitting an irradiated position on a target board to which a beam is irradiated to be accurately and instantaneously detected.

It is another object of the present invention is to provide an inspection apparatus which is capable of detecting an irradiated position on a target board to which a beam is irradiated with increased accuracy.

It is a further object of the present invention to provide an inspection apparatus which is capable of accomplishing operation of inspecting pipe deformation with increased efficiency.

DISCLOSURE OF INVENTION

In accordance with the present invention, an apparatus for inspecting deformation of a pipe is provided which includes a beam emitting unit including a beam source and arranged on one end side of the pipe and a target vehicle including a target board which is irradiated with a beam emitted from the beam source and moved from the other end side of the pipe toward the beam emitting unit, whereby an irradiated position on the target board which is irradiated with the beam is detected to inspect deformation of the pipe. The apparatus of the present invention is featured in that said target board is provided thereon with a plurality of light receiving elements, so that said irradiated position is detected depending on electric signals generated by said light receiving elements when said light receiving elements receive the beam.

In the above-described construction of the present invention, the light receiving elements on the irradiated portion of the target board each generate an electric signal. In order to ensure that detection of the irradiated position through the light receiving elements is carried out with reliability and increased accuracy, the present invention may be suitably constructed in such a manner that two or more such light receiving elements receive the beam to generate an electric signal, resulting in the irradiated position being detected depending on electric signals generated from the plural light receiving elements. In this instance, it is possible to regard a position of the light receiving element generating an electric signal of the highest intensity as the irradiated position. Alternatively, the irradiated position may be detected by operation depending on arrangement of the light receiving elements generating the electric signals and a distribution of a difference in intensity between the electric signals. This permits the irradiated position thus detected to be coincident with a center of an irradiated portion of the target board which may be possibly between the light receiving elements or be more approached to the center, so that the irradiated position may be detected with increased accuracy.

Thus, the present invention is preferably constructed in such a manner that at least two of the light receiving elements concurrently receive the beam, resulting in the irradiated position on the target board being detected by operation depending on a distribution of a difference in intensity between electric signals generated by the plural light receiving elements which have received the beam.

When the pipe is subject to substantial deformation, the beam is often caused to be deviated or displaced from the target board. In the prior art, a monitor is arranged so as to monitor an image of the target board fed from a TV camera, so that the target vehicle is stopped when the beam is deviated from the target board or is likely to be deviated therefrom. Then, an angle of emission of a beam from the beam emitting unit is adjusted to impinge the beam on the target board, followed by movement of the target vehicle for restarting of the inspection. Thus, the prior art requires to interrupt inspection operation every time when the beam is deviated or likely to be deviated from the target board. It was found that such interruption is eliminated by automatically adjusting an angle of emission of the beam depending on a locus of movement of the irradiated position on the target board obtained before the beam is deviated or likely to be deviated from the target board, even when the beam is deviated or likely to be deviated from the target board or the light receiving elements each fail to generate an electric signal or any light receiving element arranged outside the target board generates an electric signal.

Thus, it was found to be advantageous that an angle of emission of a beam from the beam emitting unit is automatically adjusted depending on a locus of movement of the irradiated position on the target board.

BEST MOST OF CARRYING OUT INVENTION

Now, the present invention will be detailedly described hereinafter with reference to the accompanying drawings.

Figure 1:
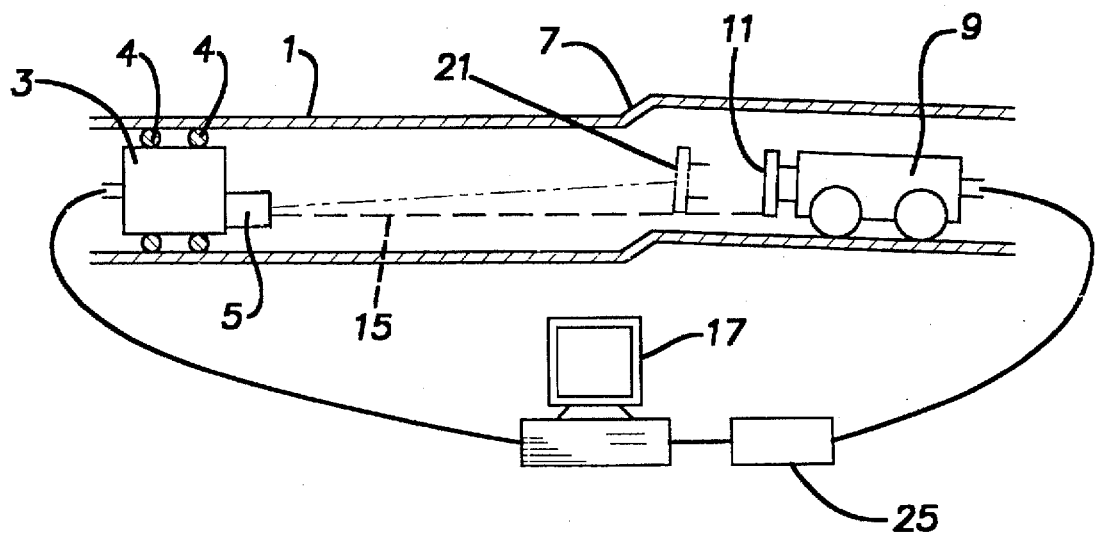
FIG. 1 is a schematic view showing the manner of inspection operation of an inspection apparatus according to the present invention.

FIG. 1 is a schematic view showing the manner of inspection operation of an inspection apparatus according to the present invention.

Figure 2:
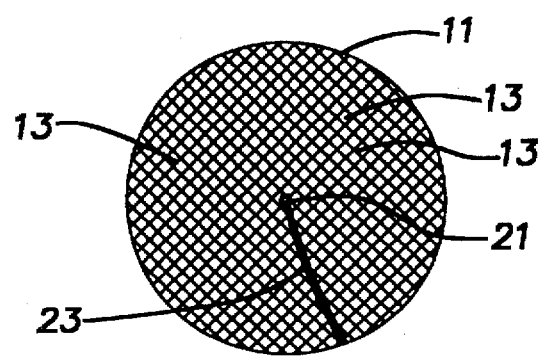
FIG. 2 is a front elevation view showing a target board.
Figure 3:
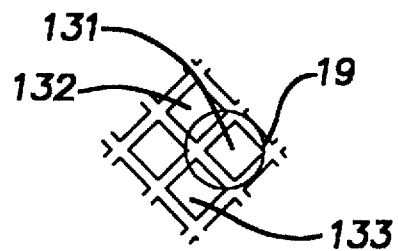
FIG. 3 is a fragmentary enlarged view of the target board shown in FIG. 2.
Figure 4:
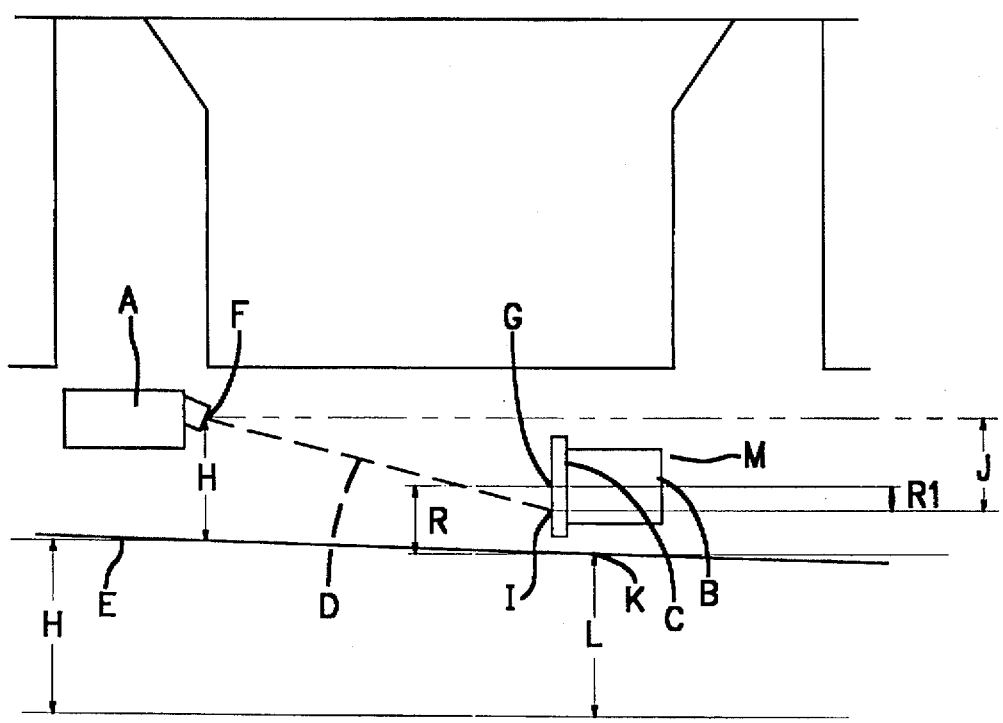
FIG. 4 is a schematic view showing a conventional inspection apparatus.

An inspection apparatus of the present invention includes a laser beam emitting unit (beam emitter) 3 arranged in a pipe or sewer 1 while being secured through a fixture 4 on one end side of the sewer 1 in a longitudinal direction thereof. The laser beam emitting unit 3 includes a beam source 5 for emitting a laser beam, which is arranged so as to be pivotally moved in any desired direction. In the illustrated embodiment, it is supposed that the sewer 1 is deformed due to differential or uneven settlement, resulting in a step or level difference 7 being formed at an intermediate section thereof. Also, the inspection apparatus of the present invention includes a crawler target vehicle 9 constructed so as to travel from the other end side of the sewer 1 toward the one end side thereof in the longitudinal direction thereof. The target vehicle 9 is mounted on a distal end portion thereof with a target board 11. The target board 11, as shown in FIG. 2, has a plurality of phototransistors 13 each acting as a light receiving element arranged on a front surface thereof in a network-like pattern, so that, for example, three phototransistors 131, 132 and 133 are irradiated with a laser beam 15 emitted from the laser beam emitting unit 3 as shown in FIG. 3, wherein reference numeral 19 designates an irradiated portion of the three phototransistors 131, 132 and 133. This results in the phototransistors 131, 132 and 133 each generating an electric signal, which is then inputted to a personal computer 17 installed on the ground. The personal computer 17 acts to calculate or compute a center of the irradiated portion 19 or a position in proximity to the center on the basis of or depending on locations of the three phototransistors 131, 132 and 133 and an electric signal distribution depending on a difference in intensity between the electrical signals, so that the center or position is recognized to be an irradiated position, resulting in a height of a portion of the sewer 1 at which the target vehicle 9 is located being operated or detected by operation. Then, a vertical section of the portion of the sewer is prepared based on data on the height thus obtained.

A distance between the laser beam emitting unit 3 and the target board 11 is calculated or computed on the basis of a distance of movement of the target vehicle 9 from the other end side of the sewer 1. Any suitable photosensor element such as a photodiode other than such a phototransistor as described above may be used as the light receiving element. Also, a CCD image sensor may be arranged on the target board 11.

Further advancing of the target vehicle 9 causes the laser beams 15 to be deviated or displaced from the target board 11, so that the personal computer 17 is kept from being fed with any electric signal from the phototransistors 13. This results in the beam source 5 of the leaser beam emitting unit 3 being pivotally moved while being controlled by the personal computer 17 as indicated at phantom lines in FIG. 1, so that the irradiated position may be returned to the center 21 of the target board 11. A position of the center 21 is calculated or computed on the basis of a locus 23 of movement of the laser beam 15 to a position at which the laser beam 15 is displaced from the target board 11, so that the beam source 5 is pivotally moved so as to permit the laser beam 15 to irradiated to the center 21 thus calculated (see FIG. 2: adjustment is so made that the laser beam 15 is irradiated to the center 21 of the target board 11 at the time of start of the inspection).

Inspection of deformation of the sewer in a lateral direction thereof is carried out concurrent with that in the vertical direction thereof described above while calculating a position of a lateral portion of the sewer by operation.

Also, radio control of the laser beam emitting unit 3 permits an aboveground wiring for the laser beam emitting unit 3 to be eliminated, to thereby avoid traffic interference.

Further, in the drawings, reference numeral 25 designates a control unit for controlling a speed of movement of the target vehicle 9 and movement for return of the target vehicle 9 to the other end side of the sewer.

Industrial Applicability

As can be seen from the foregoing, application of the inspection apparatus of the present invention to a pipe such as a sewer or the like permits a irradiated position on the target board to which a beam is irradiated to be accurately detected on the basis of or depending on electric signals from the light receiving elements, resulting in inspection of deformation of the pipe being accomplished with increased accuracy.

The present invention may be constructed in such a manner that the light receiving elements are arranged so as to permit two or more of such light receiving elements to concurrently receive a beam, resulting in the irradiated position on the target board to which a beam is irradiated being detected depending on a difference in intensity between electric signals from the light receiving elements by operation. Such construction permits inspection of deformation of a sewer or the like to be attained with further increased accuracy.

Automatic adjustment of a beam emission angle depending on a locus of movement of the irradiated position on the target board permits a beam to be returned onto the target board without interruption of the inspection operation, resulting in inspection of a sewer or the like which has been substantially deformed being accomplished with improved efficiency.

I claim:

1. An apparatus for inspecting deformation of a pipe, comprising a beam emitting unit including a beam source and arranged on one end side of the pipe and a target vehicle including a target board which is irradiated with a beam emitted from the beam source and moved from the other end side of the pipe toward said beam emitting unit, whereby an irradiated position on said target board which is irradiated with the beam is detected to inspect deformation of the pipe, characterized in that said target board is provided thereon with a plurality of light receiving elements, so that at least two of said light receiving elements concurrently receive the beam, whereby said irradiated position is detected depending on a distribution of a difference in intensity between the electric signals from said light receiving elements receiving the beam.

2. An apparatus as defined in claim 1, characterized in that an angle of emission of the beam from said beam emitting unit is automatically adjusted depending on a locus of movement of said irradiated position on said target board.

* * * * *